Figure 1:
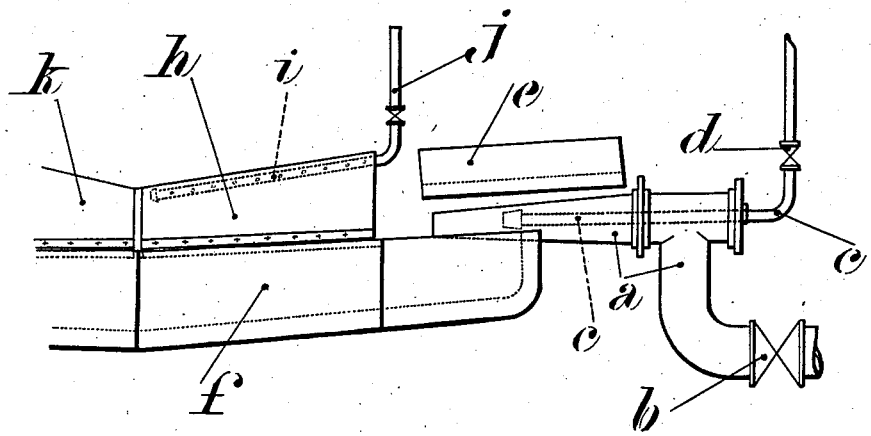

July 29, 1924.

M. MAGUET 1,502,793

PROCESS FOR REDUCING FUSED SLAG TO GRANULAR FORM

Filed March 15, 1920

Patented July 29, 1924.

1,502,793

UNITED STATES PATENT OFFICE.

MARTIAL MAGUET, OF MAXEVILLE, FRANCE.

PROCESS FOR REDUCING FUSED SLAG TO GRANULAR FORM.

Application filed March 15, 1920. Serial No. 366,015.

*To all whom it may concern:*

Be it known that I, MARTIAL MAGUET, of Maxeville, Meurthe-et-Moselle, France, chemist, a citizen of the French Republic, have invented a certain new and useful Improved Process for Reducing Fused Slag to Granular Form, of which the following is a specification.

This invention relates to an improved process for reducing fused slag to granular form and apparatus therefor. A good desulphuration of the cast metal obtained from blast furnaces requires speedy working at a very high temperature. Under these conditions the iron dross is basic and runs white. Suddenly cooled, it is highly pozuolanic and may sometimes assume hydraulic properties. Projected into the water on leaving the furnace, it generally forms swollen, spongy and light masses which float at the top and are called " cauliflowers."

The formation of the cauliflowers is as follows:—

At contact with the water the jet of calcareous, sulphuretted and incandescent iron dross, produces a partial vaporization. Some steam is immediately imprisoned in the incandescent mass and undergoes initial dissociation: an immediate internal gaseous discharge ensues which causes the swelling and momentarily hinders the water reaching the interior of the cauliflower in formation, which remains red for a certain time, whilst still floating. A part of the sulphide of calcium is attacked. The following reactions are partly produced, so long as the temperature is kept sufficiently high:—

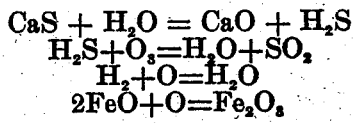

The odour of the sulphuretted hydrogen and that of the sulphurous acid are very marked. The gaseous discharge continues with the high temperature and the cauliflower floats in the form of light sponge which increases in volume as the extinguishing water becomes more reduced. This sponge is perforated in places under the force of the inner gaseous pressure, the gases which escape form small luminous fissures by burning on contact with the air. The cauliflower therefore remains incandescent for some seconds, then its temperature gradually sinks. The interior of the sponge is oxidized under the influence of the free oxygen. The grey-blue colouring of the immersed external vitreous parts produced by the traces of reduced iron, is changed to yellow and even to brown in the core of the cauliflower by superoxidization of the iron so much more so the longer incandescence of the mass.

Such a granulated substance has two chief inconveniences from the point of view of its use in the manufacture of slag bricks and cements, and in the manufacture of hydraulic mortars. After the removal of the excess of water into the decanting basins, the substance still contains from 50 to 70% of water which it retains, so to speak, indefinitely when it is preserved in the mass. Its drying is very slow and troublesome, as the sponge forms a calorifuge and firmly retains the water, the second inconvenience is that the sponge, not having been instantaneously cooled, does not possess the intrinsic pozuolanic value of the iron dross which has produced it. For these two reasons it is unsuitable for the manufactures contemplated: it would, moreover, produce bricks and mortars too friable and above all too porous.

But the melted basic iron dross can be cast in blocks, which are crushed for the construction of stone ballast, concrete or mortars. Sometimes good calcareous iron dross which is slowly cooled in the mass, spontaneously falls to dust on contact with the air: this dust is useless because it is not pozuolanic.

The process which forms the subject of the present invention is for the purpose of allowing the use of calcareous iron dross, even the most basic, in view of the remarkable pozuolanic properties which they can acquire, by granulating them so as to omit the two inconveniences above referred to.

It allows of instantaneous cooling, indispensable for the iron dross to take all its pozuolanic value and give a vitreous, friable and dense sand, retaining little water, and easy to dry with an inconsiderable expenditure of fuel.

According to this process, instead of casting direct in the water a basic iron dross in an incandescent mass as considerable as that which flows normally from the furnace in action, it is initially sufficiently divided to lower its original temperature to a desired degree at which the internal gaseous discharges are no longer produced: then, in this state of division and still in fusion, it is suddenly thrown into the water and then instantaneously and integrally cooled.

In order to carry out this process, if there is sufficient height between the slag tube and the basin of water, the spray of iron dross is projected sufficiently high on to a cast iron plate, which may be fixed or movable, suitably cooled and arranged at a certain height above a vast basin full of water. The shock of the dross on the plate divides it into incandescent drops, the ambient air produces the first necessary lowering of temperature then and at contact with the water, cooling is instantaneous and the vitreous sand falls to the bottom of the basin.

The annexed drawing represents by way of example and in diagrammatic form a very simple and inexpensive installation allowing of realizing the process which forms the object of the invention.

Figure 2:
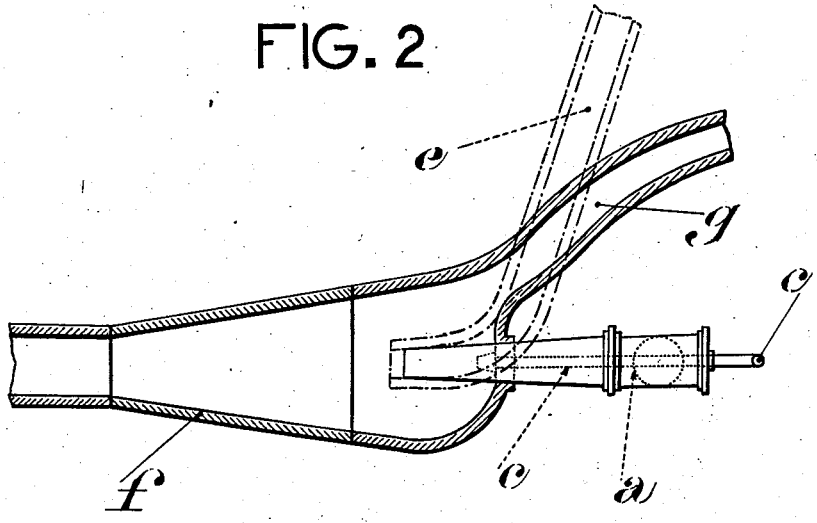

Fig. 1 is a view in elevation and Fig. 2 a view in plan.

$a$ designates a tuyere under slight pressure (10 to 15 cms. of mercury) taken in parallel from the cold air blown by a Cowper apparatus: $b$ is its regulating valve: $c$ is a water-pipe also under pressure, placed inside $a$ and $d$ its regulating cock. The amount of water injected is small and only for the purpose of moistening the cold air conveyed through the pipe $a$ in order to avoid the formation of glass cotton and small hard and vitreous spherical globules mixed with the pozuolanic product obtained by this process. $e$ is an inclined channel guiding the arrival of the fuzed slag. $f$ is another inclined channel serving for the evacuation of the granulated substance by means of a strong current of water coming from $g$. The channel $f$ is covered for a part of its length by a protecting cover $h$ against the dome of which is arranged a perforated pipe $i$ connected to a water conduit $j$ which guides the water along the walls of the cover in order to prevent the grains sticking together or against the walls of the cover, which latter is provided with an uptake $k$ for the evacuation of the steam formed by the granulation.

The tuyere $a$ and its valve $c$ are designed in accordance with the force of the jet of slag so as to obtain its reductions into melted drops which would produce the granulation in the form desired.

The addition of a small quantity of water to the blast has the effect of preventing the formation of glass cotton and small spherical vitreous non-friable globules as previously mentioned.

The installation can be arranged equally well vertically and annularly as horizontally. The granular substance obtained is generally of grey-blue colour with some parts whitish and falls directly to the bottom of the water instantly losing its high temperature.

Drained into the decanting basins it contains 10 to 15% of water. Piled up this percentage sinks to 5 to 6% after 24 hours. This granular substance is not so hard to triturate as the manganese granules generally used for slag cements and bricks. Its pozuolanic power is greater. The resistances of slag cement prepared by this process compared with granules in cauliflowers and with granules in dense sand starting from the same basic slag give an increase of 40 to 50% in favour of the latter, of which the resistances are also superior to those of manganese granules prepared under the same conditions.

The granulated substance is particularly suitable for the manufacture of slag bricks which rapidly become hard and compact and unaffected by atmospheric variations since they are not porous.

Besides the above advantages the invention allows:

1. Of obtaining a friable and dense vitreous sand economical to transport under the most reduced bulk and easy to dry and triturate, this sand having the integrality of the pozuolanic latent value of the slag treated.

2. Of employing this sand more advantageously from the point of view of economy and quality as a high active pozuolane for the replacement of granules actually used in the manufacture of slag cements and bricks and the preparation of hydraulic mortars.

What I claim as my invention and desire to secure by Letters Patent of the United States is:—

1. Process for granulating by water the highly heated basic calcareous and sulphurous slag from blast furnaces consisting in dividing the jet of slag as it issues from the furnace into small drops by means of an air blast under low pressure equivalent to 20 to 30 centimetres of water whereby the temperature of the slag is initially lowered to about 1300° C. and it loses part of its fluidity without solidifying the said drops being then precipitated direct into water which hardens these drops in fusion and causes them to burst into an infinite number of small vitreous fragments constituting a pozuolanic sand suitable for employment in the manufacture of slag cement.

2. Process for granulating by water the highly heated basic calcareous and sulphurous slag from blast furnaces consisting in dividing the jet of slag from the furnace nto small drops by means of an air blast at low pressure in conjunction with a small amount of water directed against the fused slag flowing in front of said air blast whereby the temperature of the slag is initially lowered to about 1300° C. and it loses part of its fluidity without solidifying the said drops being then precipitated direct into water which hardens these drops in fusion and causes them to burst into an infinite number of small vitreous fragments constituting a pozuolanic sand suitable for employment in the manufacture of slag cement.

In witness whereof I have signed this specification in the presence of two witnesses.

MARTIAL MAGUET.

Witnesses:
 JEAN GERMAIN,
 ALEXIS VERNAZ.